United States Patent Office 3,476,716
Patented Nov. 4, 1969

3,476,716
CONJUGATED SO₂-DIENE COPOLYMERS
Louis de Vries, Richmond, Calif., assignor to Chevron Research Company, San Francisco, Calif., a corporation of Delaware
No Drawing. Filed Mar. 23, 1967, Ser. No. 625,291
Int. Cl. C08g 25/00, 33/00
U.S. Cl. 260—79.3                    4 Claims

ABSTRACT OF THE DISCLOSURE

Conjugated cycloalkadiene-$SO_2$ copolymers useful as conductors and in the formation of articles of manufacture.

BACKGROUND OF THE INVENTION

Field of the invention

Many efforts have been directed toward preparing organic polymers which are electrically conductive. Graphite is able to conduct because of the mobility of the electrons present in the long chains of conjugated unsaturation. A number of organic polymers have been prepared which have also been found to conduct based on having a long chain of conjugated double bonds.

SUMMARY OF THE INVENTION

This invention concerns novel cyclodiene copolymers of good thermal stability having conjugated structures (assuming $SO_2$ in an organic molecule enters into conjugation) prepared by copolymerizing a conjugated cyclodiene of from 5 to 6 annular carbon atoms, i.e, cyclopentadiene and 1,3-cyclohexadiene, and then removing from 1 to 2 pairs of hydrogen atoms depending on whether the molecule is a 5 or 6 membered ring to restore, respectively, the cyclopentadiene structure or cyclohexadiene structure. The product would have the following formula:

$$-(SO_2-R)_n-SO_2-R-$$

wherein R is either 2,5-cyclopentadienylene, a salt of 2,5-cyclopentadienylene, or 1,4 - (cyclohexa - 1,3-dienylene). The polymers will generally have molecule weights of at least 30,000 and usually of from about 50,000 to 500,000.

DESCRIPTION OF THE PREFERRED EMBODIMENTS

When the polymer is a copolymer of cyclopentadienylene and $SO_2$, the polymer will for the most part have the following formula:

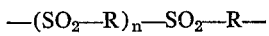

wherein $n^1$ is the number of repeating units, the end groups being dependent upon the catalyst used in the polymerization and the mode of termination.

The salt of cyclopentadienylene-$SO_2$ copolymer will have the following formula:

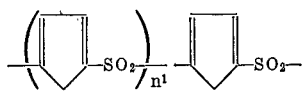

wherein $n^2$ is the number of repeating units and M is any cation, e.g., alkali and alkaline earth metals, ammonium, etc.

When the polymer is a copolymer of cyclohexadienylene and $SO_2$, the copolymer will for the most part have the formula:

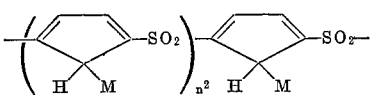

wherein $n^3$ is the number of repeating units, the end groups depending upon the catalyst used in the polymerization and the mode of termination.

The products of this invention are readily prepared by copolymerizing $SO_2$ with cyclopentadiene or 1,3-cyclohexadiene under conventional conditions, brominating the resulting product under mild conditions and then dehydrobrominating with a tert.-amine.

The cyclopentadiene product is obtained as an amine salt which by simple exchange techniques may be changed to any other amine (primary, secondary or tertiary) or metal salt or may be acidified to form the parent acid. The parent acid is a strong acid in view of the conjugation of the cyclopentadiene in the presence of the 2 sulfonyl substitutents on each ring. The cyclohexadienylene product from the cyclohexadiene/$SO_2$ polymerization will be obtained directly and will not be as acidic as the cyclopentadienylene product.

Usually, complete bromination-dehydrobromination is not achieved. However, at least 60% of the cyclic molecules will be cyclopentadienylene or cyclohexadienylene and usually better than 70%.

As indicated, the ammonium ion in the salts of the cyclopentadienylene/$SO_2$ copolymer may be derived from any amine, usually an amine of from 1 to 25 carbon atoms, more usually of from 1 to 12 carbon atoms, or ammonia. The amines may be aliphatic aromatic or heterocyclic, wherein the nitrogen atom is the annular heteroatom. Illustrative amines include ammonia, methylamine, ethylamine, diethylamine, hexylamine, octadecylamine, trimethylamine, benzylamine, dimethyl aniline, piperidine, pyridine, quinoline, imidazoline, etc. Illustrative metal salts include those having such cations as sodium, potassium, calcium, lithium, magnesium, silver, barium, etc.

In preparing the copolymers of this invention, first a conjugated cycloalkadiene of from 5 to 6 annular carbon atoms is copolymerized with $SO_2$. The polymerization is readily carried out by dissolving the cycloalkadiene in a suitable inert solvent at a temperature in the range of about $-50°$ to $0°$ C., more usually $-35°$ to $-10°$ C., adding sulfur dioxide and a small amount of a peroxidic catalyst. The reaction is then stirred for at least about 30 minutes and usually not more than 12 hours. The product may then be isolated by filtering off the polymer.

Solvents which may be used include dimethylformamide, N,N-dimethyl acetamide, etc. The concentration of the diene will generally be from about 20 to 80 weight percent, more usually about 30 to 65 weight percent.

The copolymers formed from the addition of $SO_2$ and the conjugated cycloalkadienes of from 5 to 6 carbon atoms have the following formula:

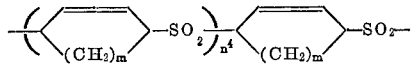

wherein $m$ is an integer of from 1 to 2 and $n^4$ is the number of units.

The bromination of the polymer is carried out by dispersing the polymer in a suitable liquid which is inert to bromine, adding bromine and allowing the reaction to proceed at temperatures in the range of about $50°$ to $125°$ C. When no further bromine appears to be reacting, the reaction is stopped and the brominated product isolated. The total time for the bromination (addition of bromine and subsequent heating) will generally be from 6 to 24 hours. The product may be purified by conventional means, e.g., reprecipitation.

Useful liquids for the bromination reaction include sulfolane. The polymer will generally be present in from 10 to 40 weight percent in the reaction mixture. The amount of bromine which is added will generally be from 1 to 1.5 times the stoichiometric amount required. The polymer which is originally insoluble in the sulfolane becomes soluble in this solvent during the bromination.

Analysis of the product indicates an average of one bromine atom per cycloalkene ring.

The resulting polymer is readily dehydrobrominated by dissolving the polymer in a suitable solvent, adding at least 2 times the stoichiometric amount of amine required to dehydrobrominate the polymer, more usually of from 3 to 10 times, and continuing the reaction for from 1 to 48 hours at a temperature in the range of about 10° to 100° C. While any tertiary amine may be used, preferred amines are those which are sterically hindered. Therefore, the preferred amines are those having alkyl groups which are branched at the carbon atom bonded to nitrogen. The amines will generally be of from about 4 to 12 carbon atoms.

Illustrative amines which find use are pyridine, diisopropyl ethylamine, tert.-butyl diethylamine, 2,6-di(tert.-butyl)-pyridine.

The resulting product may then be purified by conventional means, e.g., reprecipitation from polar solvents. Usually, at least about 70% of the bromine is removed and more usually at least about 85% of the bromine is removed as determined by analysis of the final product.

The cyclopentadienylene/$SO_2$ copolymer and its salts can be used as water soluble polymers, for ion exchange, electrical conductance, the acid as a strong organic acid, or as catalysts in organic reactions. The cyclohexadienylene/$SO_2$ copolymer can be used as a solid polymer, for combining with other materials, as an enophile, etc.

The following examples are offered by way of illustration and not by way of limitation.

EXAMPLE I (A) Into a reaction flask was introduced 59 cc. of dry dimethylformamide and the dimethylformamide cooled to —30° C. To the cooled dimethylformamide was then added 150 cc. of condensed sulfur dioxide, 25 g. of 1,3-cyclohexadiene and 2 cc. of 60% methaylethylketone peroxide in dimethylphthalate. The temperature rose to —25° C. and the mixture was stirred at a temperature in the range of —25° to —30° C. for 4 hours. At the end of this time, the $SO_2$ excess was allowed to evaporate, the polymer was precipitated in cold methanol and isolated and dried. Analysis: C, 45.50%; H, 4.95%; S, 22.65%.

(B) To a reaction flask containing 100 cc. dry sulfolane was added 27.24 g. of the above prepared copolymer. The mixture heated to 80° C. and 50 g. bromine added over a 4 hour period. The temperature was then raised to 100° C. and the mixture stirred for 24 hours. After precipitating the polymer in benzene, the polymer was washed 3 times with actone and dried in vacuo. Analysis: C, 27.7%; H, 4.05%; S, 15.95%; Br, 39.4%.

(C) An 8 g. sample of the above copolymer was dissolved in 100 cc. of dimethylformamide, the mixture cooled to 20° C. and 10.2 g. of diisopropyl ethylamine added. The mixture was allowed to warm to room temperature and stirred for 3.5 hours. The polymer was precipitated by the addition of ether, then dissolved in dimethyl sulfoxide, precipitated in aqueous acetic acid, washed with water until neutral, redissolved in dimethyl sulfoxide, precipitated in tetrahydrofuran, isolated by filtration and dried in vacuo. Analysis: C, 41.1%; H, 3.63%; S, 16.51%; Br, 13.74%.

EXAMPLE II (A) Into a reaction flask was introduced 90 cc. of dry dimethylformamide and the dimethylformamide cooled to —30° C. To the cooled dimethylformamide was added 38.5 cc. of freshly distilled cyclopentadiene, 200 cc. of condensed sulfur dioxide and 2 cc. of tert.-butyl hydroperoxide. After 30 minutes, 4 cc. of 60% methylethylketone peroxide in dimethylphthalate was added. The mixture was stirred at the same temperature for 4 hours. At the end of this time, cold methanol was added and the precipitated polymer isolated. Analysis: C, 46.0%; H, 5.65%; S, 24.17%.

(B) Into a reaction flask was introduced 34.1 g. of the above copolymer and 150 cc. of sulfolane, the mixture heated to 80° C. and 50 g. of bromine added over a 4-hour period. The temperature was then raised to 100° C. and maintained for 24 hours. The product was then precipitated in benzene, washed 3 times with acetone and dried in vacuo. Analysis: C, 28.65%; H, 3.68%; S, 14.84%; Br, 37.29%.

(C) Into a reaction flask was introduced 10 g. of the above polymer and 100 cc. of dimethylformamide and the mixture cooled to —20% C. To the cooled mixture was added 13.35 g. of diisopropyl ethylamine and the mixture allowed to warm to room temperature and stirred for 3 hours. At the end of this time, the product was precipitated in ether, then dissolved in dimethyl sulfoxide, and reprecipitated in ether 3 times, while maintaining a nitrogen atmosphere. The solution of the product is purple, while the prior polymers are colorless, or only slightly yellow, both in solution and when isolated. Analysis: C, 51.3%; H, 4.85%; S,16.75%; Br, 2.25%; N, 3.36%.

It is evident from the above experiments that novel copolymers are obtained having extremely interesting physical properties and finding a wide variety of uses. Because of their conjugated structure, the polymers are electrically conducting, provide attractively colored solutions, are enophiles and therefore may be modified to form numerous products having different physical properties tailored for individual situations, are able to scavenge oxygen and may be used as catalysts, for ion exchange and in combination with other polymers to impart novel properties to the compositions.

As will be evident to those skilled in the art, various modifications on this invention can be made or followed, in the light of the foregoing disclosure and discussion, without departing from the spirit or scope of the disclosure or from the scope of the following claims.

I claim:

1. A copolymer of at least about 30,000 to 500,000 molecular weight consisting essentially of a recurring unit of the formula:

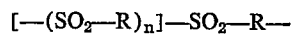

wherein R is 2,5-cyclopentadienylene, a salt of 2,5-cyclopentadienylene, or 1,4-(cyclohexa-1,3-dienylene).

2. A copolymer of at least about 30,000 to 500,000 molecular weight consisting essentially of a recurring unit of the formula:

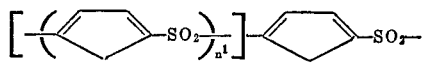

3. A copolymer of at least 30,000 to 500,000 molecular weight consisting essentially of a recurring unit of the formula:

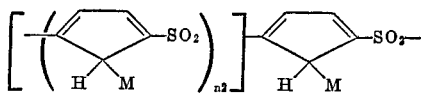

wherein M is hydrogen, ammonium or metal cation.

4. A copolymer of at least about 30,000 to 500,000 molecular weight consisting essentially of a recurring unit of the formula:

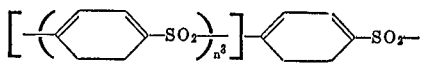

(References on following page)

References Cited

UNITED STATES PATENTS 2,192,466 3/1940 Frey et al.
3,336,273 8/1967 Youngman et al.

OTHER REFERENCES

Chemical Abstract, vol. 60, pg. 5656 (1964).

Boundy-Boyer, "Styrene—Its Polymers, Copolymers and Derivatives," 1952—published by Reinhold—New York, p. 19.

JAMES A. SEIDLECK, Primary Examiner

U.S. Cl. X.R.

252—500; 260—29.7, 94.7